United States Patent [19]

Herndon

[11] Patent Number: 4,655,417
[45] Date of Patent: Apr. 7, 1987

[54] MOLDED EJECTION SEAT HAVING AN INTEGRATED ROCKET MOTOR ASSEMBLY

[75] Inventor: Gerald F. Herndon, Bellevue, Wash.

[73] Assignee: The Boeing Company, Seattle, Wash.

[21] Appl. No.: 655,892

[22] Filed: Sep. 28, 1984

[51] Int. Cl.⁴ .................. B64D 25/10; B64D 11/06
[52] U.S. Cl. ........................ 244/122 A; 244/122 R; 244/122 AD
[58] Field of Search ........ 244/122 R, 122 A, 122 AB, 244/122 AD, 122 AE; 297/443, 444, DIG. 2; 60/250, 253, 255, 256

[56] References Cited

U.S. PATENT DOCUMENTS

| | | | |
|---|---|---|---|
| 2,981,317 | 4/1961 | Cartwright et al. | 155/178 |
| 3,083,938 | 4/1963 | Brinkworth et al. | 244/122 |
| 3,142,959 | 8/1964 | Klein | 60/250 |
| 3,158,344 | 11/1964 | Koochembere | 244/122 |
| 3,186,662 | 6/1965 | Martin | 244/122 |
| 3,190,589 | 6/1965 | Mennborg | 244/122 |
| 3,259,344 | 7/1966 | Thoro | 244/122 |
| 3,293,860 | 12/1966 | Stedfeld | 60/253 |
| 3,316,718 | 5/1967 | Webb | 60/255 |
| 3,516,098 | 6/1970 | O'Link | 9/12 |
| 3,555,825 | 1/1971 | Dilchert | 60/256 |
| 3,561,703 | 2/1971 | Stencel | 244/122 |
| 3,564,845 | 2/1971 | Freidman, Jr. et al. | 60/250 |
| 3,632,159 | 1/1972 | Barecki | 296/63 |
| 3,647,168 | 3/1972 | Eggert, Jr. et al. | 244/122 |
| 3,663,057 | 5/1972 | Lohr et al. | 297/DIG. 2 |
| 3,701,502 | 10/1972 | Martin | 244/122 |
| 3,726,499 | 4/1973 | Stencel | 244/141 |
| 3,833,191 | 9/1974 | Morton | 244/122 |
| 4,458,595 | 7/1984 | Gerrish, Jr. et al. | 60/253 |
| 4,495,764 | 1/1985 | Gnagy | 60/255 |
| 4,507,165 | 3/1985 | Herring | 60/253 |
| 4,526,421 | 7/1985 | Brennan et al. | 297/DIG. 2 |

FOREIGN PATENT DOCUMENTS 120305 9/1979 Japan ...................... 60/256

Primary Examiner—Galen Barefoot
Assistant Examiner—Lynn M. Fiorito
Attorney, Agent, or Firm—Eugene O. Heberer

[57] ABSTRACT

A substantially one piece molded shell ejection seat (10) having a rocket motor propulsion system (74), the propulsion system (74) being adapted to be integrated into the molded seat (10) during the molding process. The seat body (12) has upper and lower side walls (14, 16, 20, 22), front wall (60) between the lower side walls (20, 22) and back wall portions (30, 32, 34, 36, 38, 40, 42, 44). A molded backrest panel (50) is removably secured to the body (12) to extend generally between the upper side walls (14, 16). The rocket motor propulsion system (74) is incorporated within the body (12) below the upper side walls (14, 16), within the lower side walls (20, 22), generally rearwardly of and below the backrest panel (50), and generally rearwardly of the occupant sitting area (66). A rocket nozzle (78) is connected to the motor (86) by a manifold (82) and is fitted generally within the lower back seat periphery and seat envelope. The rocket motor propulsion system (74) is formed as a consolidated honeycomb-type assembly of pressure vessels (86). Each chamber (86) has a frangible blowout diaphragm (104) to blowout into the manifold when the chamber propellant is initiated. The other ends of the chambers are enclosed and each is connected to a respective initiator (100).

16 Claims, 7 Drawing Figures

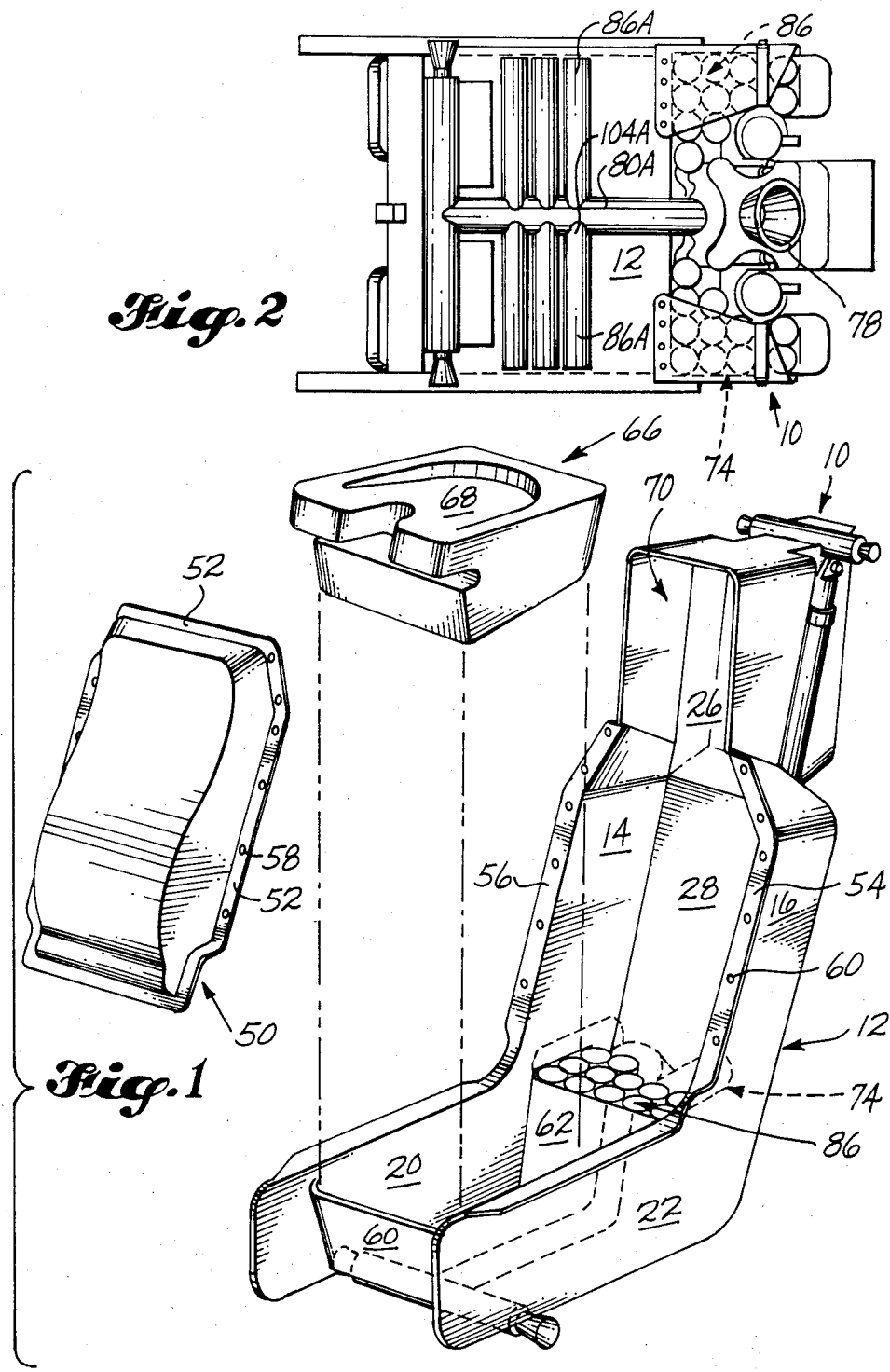

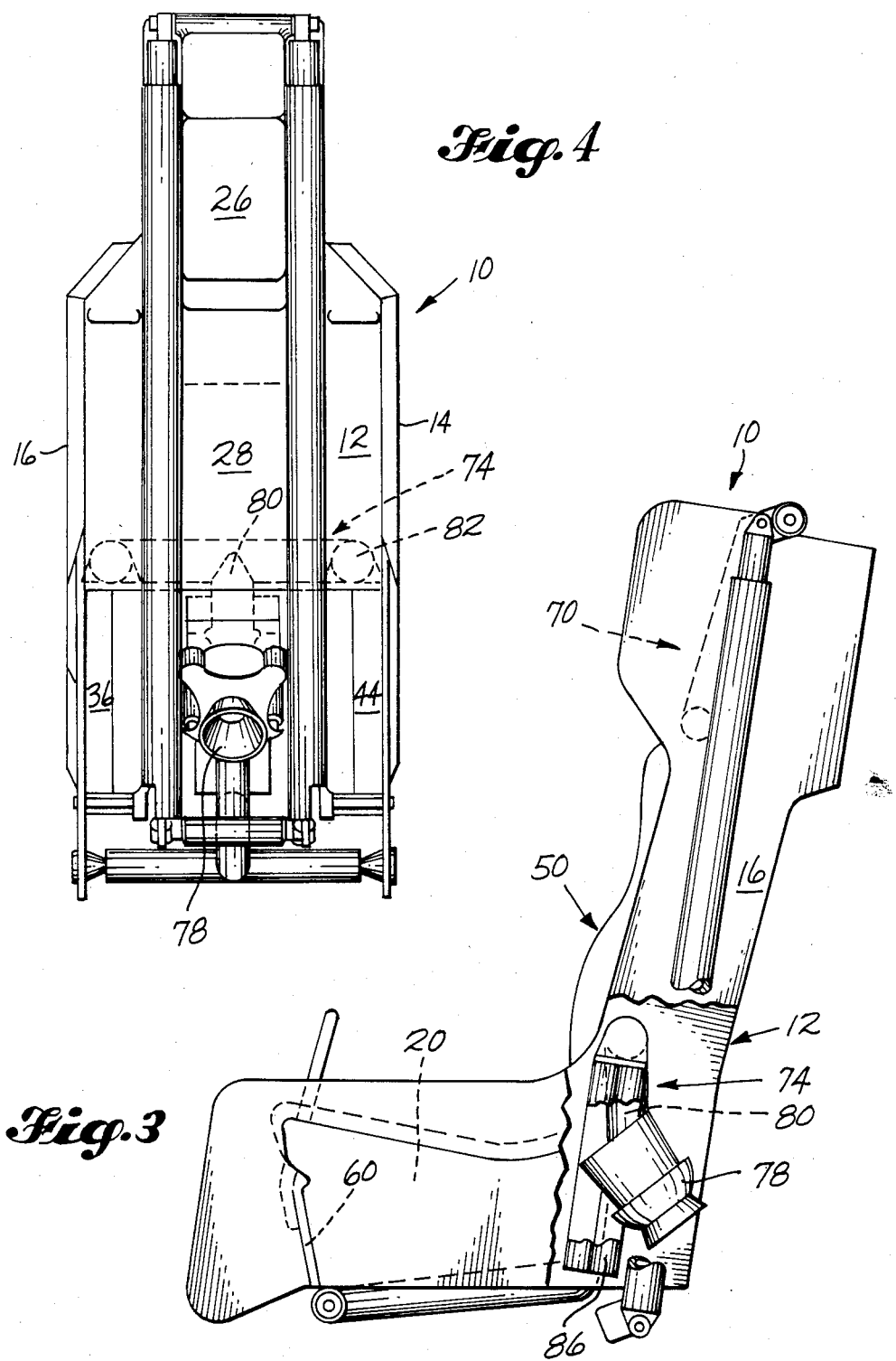

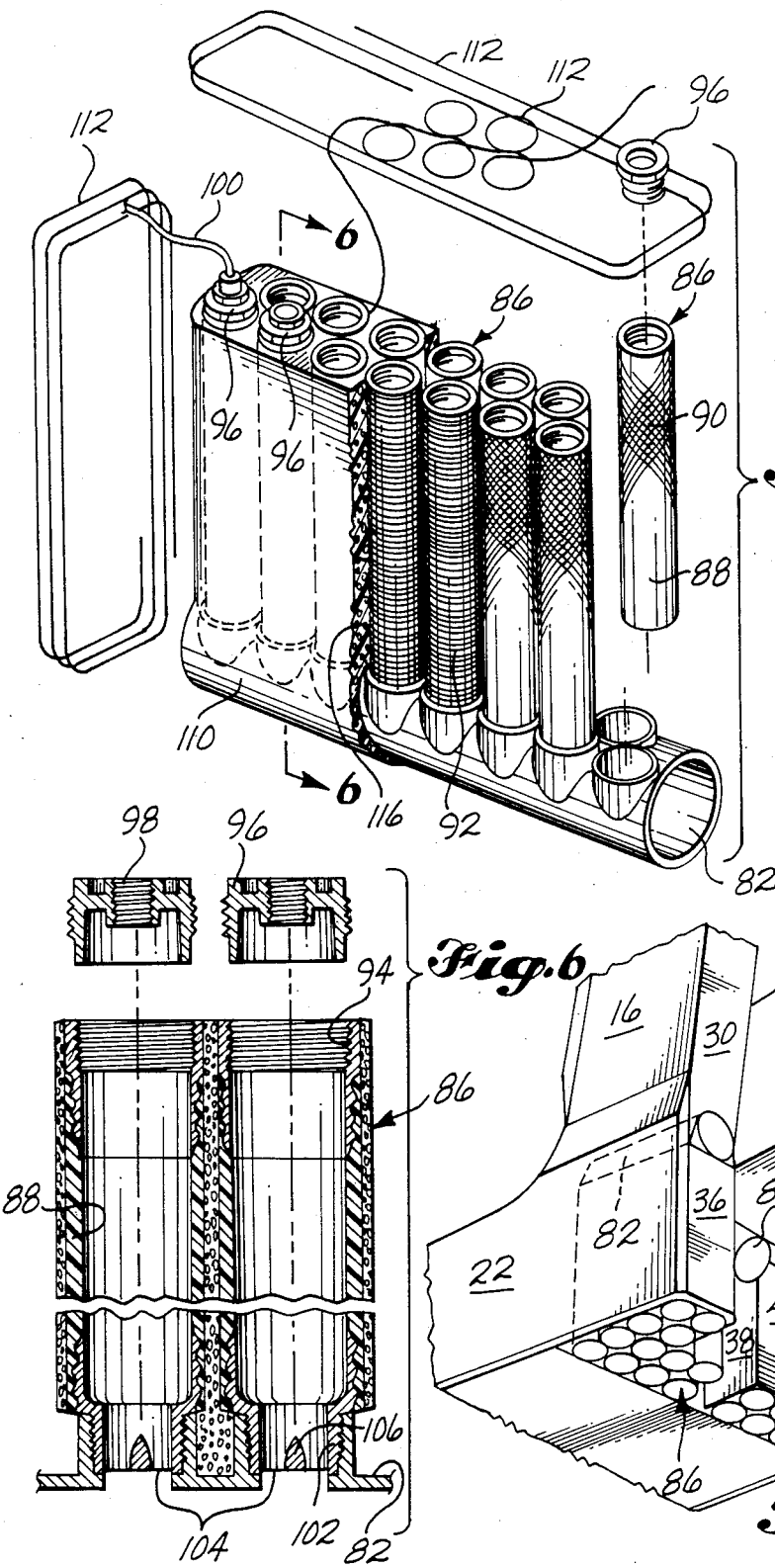
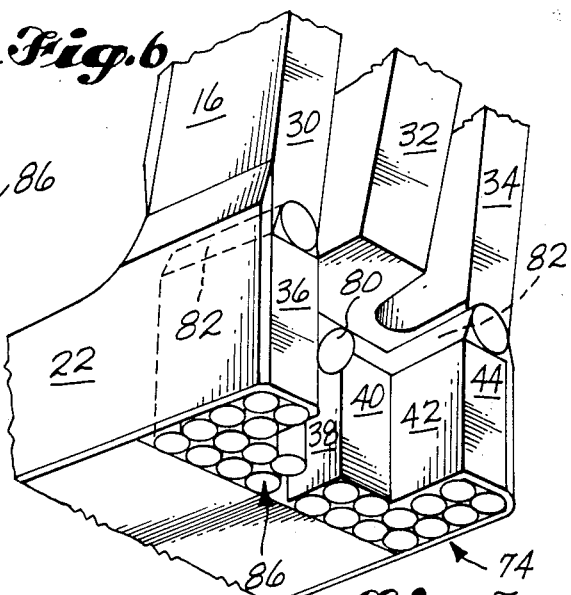
Fig. 5
Fig. 6
Fig. 7

MOLDED EJECTION SEAT HAVING AN INTEGRATED ROCKET MOTOR ASSEMBLY

TECHNICAL FIELD

The invention relates to aircraft ejection seats, and more particularly, seats made of materials having specific high strength to weight ratios.

BACKGROUND ART

Ejection seats currently being used in high performance military aircraft have been fabricated from bits and pieces of metal aircraft structure. The geometry of these seats is such that structural load paths are less efficient than in the aircraft structures which means that the present seats are not likely to be in the form of optimum seat structures. The present seat structures tend to be heavier than load considerations would indicate that they should be and the fabrication is very labor intensive so as to make the seats excessively costly.

Advances in tactical aircraft performance capability and tactics have led to an increase in the number of ejection related casualties and the recognition that a corresponding and improvement in ejection seat capability is needed in order to protect crew members from injury or death in emergency situations, as well as improve their ability to perform effectively under high inflight accerations.

Studies have demonstrated some of the possible improvements which could be made to ejection seats in terms of weight and increased operational capability. In order to achieve the required performance improvements, it becomes increasingly important to minimize the weight of the seat structure in order to help offset the added weight of other subsystems, such as propulsion and life support.

A search of the patent literature discloses a number of ejection seats having rocket attachments, as follows:

U.S. Pat. No. 2,981,317, Cartwright, Jr. et al;
U.S. Pat. No. 3,083,938, Brinkworth et al;
U.S. Pat. No. 3,158,344, Koochembere;
U.S. Pat. No. 3,186,662, Martin;
U.S. Pat. No. 3,190,589, Mennborg;
U.S. Pat. No. 3,259,344, Thorp;
U.S. Pat. No. 3,516,098, O'Link;
U.S. Pat. No. 3,561,703, Stencel;
U.S. Pat. No. 3,632,159, Barceki;
U.S. Pat. No. 3,647,168, Eggert, Jr. et al;
U.S. Pat. No. 3,701,502, Martin;
U.S. Pat. No. 3,726,499, Stencel;
U.S. Pat. No. 3,833,191, Morton.

DISCLOSURE OF THE INVENTION

The invention is an ejection seat structure concept based on the use of advanced composite materials having high specific strength in a multifunctional generally one piece structural shell configuration. With such a shell configuration, according to the invention, structural weight is minimized by integrating several structural functions into a single structural unit, capable of utilizing the same material for different, non-coincident, loading conditions.

The invention is substantially a one piece shell ejection seat having a rocket motor propulsion system integrated with the seat. There is a seat body having upper and lower side walls, a front wall between the lower side walls and back wall portions extending generally between the upper and lower side walls. A backrest panel is removably secured to the body to extend generally between the upper side walls to increase torsional rigidity of the seat back structure by closing a torque box formed with the upper side walls, back wall portions and the back rest panel. A rocket motor propulsion system is incorporated within the body below the upper side walls within the lower side walls, generally rearwardly of and below the backrest panel, and generally rearwardly of the occupant seating area. A rocket nozzle is connected to the propulsion system and is fitted generally rearwardly of the occupant seating area. A rocket nozzle is connected to the propulsion system and is fitted generally within the lower back seat periphery and the seat envelope.

The seat body may be typically comprised of composite material including cured epoxy reinforced with graphite.

The rocket motor propulsion system is formed as a consolidated honeycomb-type assembly of pressure vessels which utilize the strength of shared pressure containment walls to reinforce the lower part of the molded seat body and eliminates concentrated rocket thrust load transfer and material utilization. the honeycomb assembly is comprised of a series of individual propellant chambers, each chamber being generally adjacent to other chambers and being interconnected to a manifold connected to the rocket nozzle. The propellant in each chamber is connected to be initiated separately or jointly.

The cylindrical chambers are arranged to have their axis generally parallel and are grouped to generally form a U in the direction of the axes, the manifold being U-shaped to be connected to one of the ends of each of the chambers, the nozzle being connected to the manifold within the legs of the U-shaped group of chambers. Each chamber has a fitting at one end, connected to the manifold, the last fitting having a frangible blowout diaphragm, the diaphragm blowing out into the manifold when the chamber propellant is initiated. The other ends of the chambers are enclosed and each is connected to a respective initiator.

Each chamber is comprised of a cured plastic, reinforced with braided carbon fibers to form a composite material, the chambers being wound generally circumferentially with additional filament reinforcement to form pressure vessel cylinders. Threaded steel closure fittings are integrated into the composite cylinders, the fittings at the manifold be connected to a steel manifold liner having a filament wound reinforcement. The motor assembly is encapsulated with composite material by a three dimensional weaving between adjacent chambers, the last composite material forming temperature insulation between chambers and the encapsulated motor is positioned into the seat mold to be integrated in the seat body during the molding process.

The invention includes the rocket motor propulsion system assembly for integrating into a molded ejection seat during the molding process.

A primary objective of the invention is to minimize structural weight by integrating several structural functions into a single structural unit, namely, a seat shell, capable of utilizing the same material for different, non-coincident, loading conditions. The shell structure maximizes the section modulus by locating the load carrying material as far away from the neutral bending and torsion axes as possible.

In the consolidated honeycomb-type assembly of pressure vessels forming the rocket motor, structural strength to weight optimization is achieved by utilizing the strength and stiffness of subcomponent housing structures to help stiffen the simple cell structure. This reduces the requirement for complex integral or separate mechanically fastened stiffeners. According to the invention, a multifunctional element approach is maximized in the seat structure.

Novel features and advantages of the ejection seat, according to the invention, include an advance composite shell structure, a removable back rest for improved subcomponent maintainability, rocket motor containment structure integrated into seat support structure, and advanced composite fabrication concepts for the rocket motor chamber assembly structure.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 1 is an exploded pictorial view of an ejection seat having a rocket motor assembly integrated therewith, according to the invention;

FIG. 2 is a bottom view of the seat shown in FIG. 1;

FIG. 3 is a side elevational view of the ejection seat shown in FIG. 1;

FIG. 4 is a rear elevational view of the seat;

FIG. 5 is a fragmentary exploded view of a portion of a rocket motor assembly to be integrated into the seat;

FIG. 6 is a cross-sectional view taken along the line 6—6 in FIG. 5; and

FIG. 7 is a fragmentary cutaway view of the rear and bottom of the seat, illustrating an arrangement of the integrated rocket motor assembly.

BEST MODE FOR CARRYING OUT THE INVENTION

Referring again to the drawings, there is shown in FIGS. 1-4 an ejection seat, generally designated as 10, having a shell or body 12 made substantially of a single molded structure. The seat, for example, may be made of a cured molded epoxy reinforced with graphite filaments or fibers. The seat body has upper side walls 14 and 16, lower side walls 20 and 22, back wall portions 26, 28, 30, 32, 34, 36, 38, 40, 42, and 44, extending generally between the upper and lower side walls. The back wall portions have spaces therebetween to receive ejection catapults.

The shell or body is completed with the addition of a molded composite backrest panel, generally designated as 50. The backrest has a peripheral flange 52 adapted to be secured by fasteners to flanges 54 and 56 on the front of the seat through openings 58 and 60. The backrest panel extends generally between the upper side walls to increase torsional rigidity of seat back structure by closing a torque box formed by the upper side walls 14, 16, the back wall portions and the backrest panel 50. It is seen that this structure of the shell 12 maximizes the section modulus by locating load carrying material as far away from the neutral bending and torsion axes as possible.

The body has a forward integral lower wall 60 and an intermediate rear integral lower wall 62 extending between the lower side walls 29 and 22, the four walls providing a cavity for a combined seat bottom and survival kit 66. Thus, a seat occupant or crew member, during normal operation, sits on an upper part 68 of the seat bottom and survival kit, has his back on the backrest panel 50 and has his head generally within the upper box portion 70, and has his legs extending over and forwardly of the wall 60.

A rocket motor propulsion system assembly, generally designated as 74, is incorporated within the body below the upper side walls 14 and 16, within the lower side walls 20 and 22, and generally rearwardly of and below the backrest seat panel 50. The assembly 74 is integrated into the body as the body is formed in a molding or other plastic forming process. A rocket nozzle 78 is connected to the motor 74 through a tube 80, extending from a central portion of a U-shaped manifold 82, connected to the rocket assembly 74, FIGS. 1-5 and 7.

The rocket motor propulsion assembly 74 is formed as a consolidated honeycomb-type assembly of pressure vessels or cylindrical chambers 86 which utilize the strength of shared pressure containment walls to reinforce the lower part of the molded seat body, eliminate concentrated rocket thrust load transfer points, and create an efficient structure for load transfer material utilization.

The chambers are made from precured resins, such as an epoxy, as at 88, which impregnates braided carbon fiber 90, the carbon fibers being wound in the braids at angles to each other. The braided carbon is further reinforced with graphite or other suitable resin impregnated filaments 92, circumferentially wound around the braided fibers to form the pressure vessel cylinders 86.

Threaded steel fittings 94, FIG. 6, are integrated into the composite cylinders, each fitting 94 being adapted to receive a threaded closure cap 96. The closure caps have a threaded central opening 98 in which an individual initiator 100 is threadedly engaged, FIG. 5.

At the lower end of the pressure vessels 86, there is a steel sleeve 102 threadedly engaged with the manifold 82. Each sleeve 102 has a frangible blowout diaphragm 104 with a diametrically positioned supporting beam 106. The manifold 82 also has a filament wound reinforcement impregnated in a cured resin 110, FIG. 5.

The assembly is encapsulated with composite material by means of three dimensional weaving of impregnated fibers 112 externally of the entire assembly and interwoven between the individual chambers, each chamber being generally adjacent to other chambers.

The chambers have their axes generally parallel to form a U-shaped group viewed in the direction of the axes, FIGS. 1, 2, and 7, the manifold being U-shaped to be connected to the ends of the chambers having the diaphragms. The chambers may also be covered wtih chopped fibers, such as graphite, and a resin filler with a mat overlay as indicated at 110 and 116 in FIG. 5. The assembly thus made is integrated into the basic seat structural shell as the shell is being molded.

Because each chamber is positioned adjacent to other chambers, there is additional composite material, as at 116, to provide heat insulation between chambers to prevent excessive heat from an initiated chamber being transferred to an uninitiated chamber.

As shown in FIG. 2, additional pressure vessels 86A, made in the same manner as vessels 86, are shown positioned on the bottom of the seat in a juxtaposed relationship and have their diaphragm ends 104A interconnected with a manifold connection tube 80A to deliver the propellant gas to the rocket nozzle 78.

Each pressure vessel is adapted to be loaded with a propellant which may be initiated by the initiators 96, FIG. 5, jointly or separately in accordance with the rocket thrust being necessary, after the seat has been ejected from an aircraft, to move the seat away from the aircraft, stabilize the seat, and correct the attitude as needed.

In a typical ejection operation, a microprocessor in the aircraft could automatically initiate the amount of propellant needed to accomplish the thrust necessary to properly move the ejected seat away from the aircraft and maneuver the seat to a proper attitude for the ultimate descension by the seat and crew member. The propellants can also be initiated after ejection by the crew member. Individual diaphragms blowout as the propellant in a specific vessel is initiated and where the propellants are not initiated the diaphragms remain in tact.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. A molded injection seat having a rocket motor propulsion system integrated with the seat, comprising:
   a seat body having upper and lower side walls, a front wall between the lower side walls, and back wall portions extending generally between the upper and lower side walls;
   a backrest panel removably secured to the body to form a front thereof and to extend generally between the upper side walls to increase torsional rigidity of the seat structure by closing a torque box formed with the upper side walls, back wall portions, and the backrest panel;
   a rocket motor propulsion system being incorporated within the body below the upper side walls within the lower side walls, generally rearwardly of and below the backrest panel, and generally rearwardly of the occupant sitting area; and
   a rocket nozzle being connected to the propulsion system and being fitted generally within the lower back seat periphery and the seat envelope;
   the rocket motor propulsion system being integrated into the body as it is being formed;
   the rocket motor propulsion system being formed as a consolidated honeycomb-type assembly of pressure vessels which utilize the strength of shared pressure containment walls to reinforce the lower part of the molded seat body and eliminate concentrated rocket thrust load transfer points and create an efficient structure for load transfer and material utilization;
   the honeycomb assembly being comprised of a series of individual cylindrical propellant chambers, each chamber being generally adjacent to other chambers; and
   each chamber being interconnected to a manifold connected to the rocket nozzle.

2. The invention according to claim 1 in which:
   the seat body is comprised of composite material including cured epoxy reinforced with graphite.

3. The invention according to claim 1 in which:
   the propellant in each chamber is connected to be initiated separately or jointly.

4. The invention according to claim 1 in which:
   the cylindrical chambers are arranged to have their axes generally parallel and are grouped to generally form a U in the direction of the axes, the manifold being U-shaped to be connected to one of the ends of each of the chambers;
   the nozzle being connected to the manifold within the legs of the U-shaped group of chambers;
   each chamber having a fitting at the one end, connected to the manifold, said last fitting having a frangible blowout diaphragm, the diaphragm blowing out into the manifold when the chamber propellant is initiated;
   the other ends of the chambers being enclosed and each being connected to a respective initiator;
   the honeycomb assembly being enclosed and fitted generally within said back wall portions between the lower side walls; and
   the back wall portions having spaced therebetween to receive ejection catapults.

5. The invention according to claim 4 in which:
   each chamber is comprised of cured plastic, reinforced with braided carbon fibers to form a composite material, the chambers being wound generally circumferentially with additional filament reinforcement to form pressure vessel cylinders.

6. The invention according to claim 5 in which;
   threaded steel closure fittings are integrated into the composite cylinders;
   the fittings at the manifold being connected to a steel manifold liner having a filament wound reinforcement.

7. The invention according to claim 6 in which:
   the motor assembly is encapsulated with composite material by a three dimensional weaving process between adjacent chambers;
   said last composite material forming temperature insulation between chambers;
   the encapsulated motor assembly being positioned into the seat mold to be integrated in the seat body during the molding process.

8. The invention according to claim 6 in which:
   the motor assembly is encapsulated with composite material including chopped fibers and resin filler with a mat overlay;
   said last composite material forming temperature insulated between chambers;
   the encapsulated motor assembly being positioned into a seat mold to be integrated in the seat body during the molding process.

9. A rocket motor propulsion system assembly for integrating into a molded ejection seat during the molding process, comprising:
   a rocket motor propulsion system formed as a consolidated honeycomb-type assembly of pressure vessels which utilize the strength of shared pressure containment walls to reinforce a lower part of an ejection seat molded body to eliminate concentrated rocket thrust load transfer points and create an efficient structure for load transfer and material utilization;
   the honeycomb assembly being comprised of a series of individual cylindrical propellant chambers, each chamber being generally adjacent to other chambers;

each chamber being interconnected to a manifold connected to a rocket nozzle;

a propellant in each chamber being connected to be initiated separately or jointly;

the cylindrical chambers being arranged to have their axes generally parallel and are grouped to generally form a U in the direction of the axes, the manifold being U-shaped to be connected to one of the ends of each of the chambers;

a rocket nozzle is connected to the manifold within the legs of the U-shaped group of chambers;

each chamber having a fitting at the one end, connected to the manifold, said last fitting having a frangible blowout diaphragm, the diaphragm blowing out into the manifold when the chamber propellant is initiated; and the other ends of the chambers being enclosed and each being connected to a respective initiator.

10. The invention according to claim 9 in which:

each chamber is comprised of cured plastic, reinforced with braided carbon fibers to form a composite material, the chambers being wound generally circumferentially with additional filament reinforcement to form pressure vessel cylinders.

11. The invention according to claim 10 in which:

threaded steel closure fittings are integrated into the composite cylinders;

the fittings at the manifold being connected to a steel manifold liner having a filament wound reinforcement.

12. The invention according to claim 11 in which:

the motor assembly is encapsulated with composite material by a three dimensional weaving process between adjacent chambers;

said last composite material forming temperature insulation between chambers.

13. The invention according to claim 11 in which:

the motor assembly is encapsulated with composite material including chopped fibers and resin filler with a mat overlay;

said last composite material forming temperature insulation between chambers.

14. The invention according to claim 9 in which:

the motor assembly is fitted into a seat body;

the seat body having upper and lower side walls, a front wall between the lower side walls, and back wall portions extending generally between the upper and lower side walls;

a backrest panel removably secured to the body to form a front thereof and to extend generally between the upper side walls to increase torsional rigidity of the seat structure by closing a torque box formed with the upper side walls, back wall portions, and the backrest panel;

the motor assembly being incorporated in the seat body below the upper side walls within the side walls, generally rearwardly of and below the backrest panel, and generally rearwardly of the occupant sitting area;

the rocket nozzle being connected to the manifold and being fitted generally within the lower back seat periphery and the seat envelope;

the back wall portions having spaces therebetween to receive ejection catapults.

15. The invention according to claim 6 in which:

additional chambers are integrated with the seat body thereunder forwardly of the U-shaped group assembly;

said additional chambers being connected to an additional manifold which is connected to the manifold for the U-shaped group.

16. The invention according to claim 14 in which:

additional chambers are integrated with the seat body thereunder forwardly of the U-shaped group assembly;

said additional chambers being connected to an additional manifold which is connected to the manifold for the U-shaped group.

* * * * *

UNITED STATES PATENT AND TRADEMARK OFFICE
CERTIFICATE OF CORRECTION

PATENT NO. : 4,655,417
DATED : April 7, 1987
INVENTOR(S) : Gerald F. Herndon

It is certified that error appears in the above-identified patent and that said Letters Patent are hereby corrected as shown below:

Column 1, line 47, "Barceki" should be -- Barecki --.

Column 2, lines 12-14, after "generally", delete "rearwardly of the occupant seating area. A rocket nozzle is connected to the propulsion system and is fitted generally -- .

Column 2, line 23, after "transfer", add -- points and creates an efficient structure for load transfer -- .

Column 2, line 24, "the" should be -- The --.

Column 4, line 1, "side walls 29 and 22" should be -- side walls 20 and 22 --.

Column 4, line 55, "wtih" should be -- with --.

Claim 4, column 6, line 24, "spaced" should be -- spaces --.

Claim 6, column 6, line 32, "which;" should be -- which: --.

Claim 8, column 6, line 52, "insulated" should be -- insulation --.

Signed and Sealed this

Eighth Day of September, 1987

Attest:

DONALD J. QUIGG

Attesting Officer

Commissioner of Patents and Trademarks